United States Patent
D'Alo' et al.

(10) Patent No.: US 7,308,438 B2
(45) Date of Patent: Dec. 11, 2007

(54) ADAPTIVE MANAGEMENT METHOD WITH AUTHORIZATION CONTROL

(75) Inventors: Salvatore D'Alo', Rome (IT); Alex Donatelli, Rome (IT); Giovanni Lanfranchi, Piacenza (IT); Claudio Marinelli, Latina (IT)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 11/065,603

(22) Filed: Feb. 24, 2005

(65) Prior Publication Data
US 2005/0240593 A1 Oct. 27, 2005

(30) Foreign Application Priority Data
Apr. 23, 2004 (EP) .................. 04388032

(51) Int. Cl.
G06F 7/00 (2006.01)
(52) U.S. Cl. ........................ 707/2; 707/10
(58) Field of Classification Search .......... 707/1–10
See application file for complete search history.

(56) References Cited

U.S. PATENT DOCUMENTS

2003/0131073 A1* 7/2003 Lucovsky et al. .......... 709/219
2003/0208397 A1* 11/2003 VanDusen .................... 705/14
2004/0148274 A1* 7/2004 Warnock et al. ............... 707/2

* cited by examiner

Primary Examiner—Wilson Lee
(74) Attorney, Agent, or Firm—Duke W. Yee; Jeffrey S. LaBaw; Cathrine K. Kinslow

(57) ABSTRACT

A self-adaptive resource management method and a corresponding system are proposed. In the solution of the invention, an authority (105) publishes multiple rules into a corresponding repository (115). Each rule defines a desired target configuration for a category of subjects (110). Some of the rules can be conditioned to an authorization for their application on the subjects (by means of an optional enabling code). Whenever a generic subject tries to apply a conditioned rule, a test is made to verify whether the application of the rule has been authorized for the subject; if not, the subject is considered not compliant with the rule for a lack of authorization. A supervisor (135) authorizes each enabling code in an asynchronous way (with respect to the application of the corresponding rules); for example, the supervisor can authorize the enabling code for specific subjects, for a group of subjects (defined either statically by a list of subjects or dynamically by their characteristics), or for all the subjects. In this way, the application of the rules on the different subjects can be controlled centrally (for example, during a transition from a resource management system based on the enforcement model) without impairing the self-adaptive model.

20 Claims, 8 Drawing Sheets

ADAPTIVE MANAGEMENT METHOD WITH AUTHORIZATION CONTROL

TECHNICAL FIELD

The present invention relates to the data processing field, and more specifically to a resource management method and a corresponding system.

BACKGROUND ART

Management of different types of resources (such as software components, applications or devices) is a critical issue in a data processing system with a distributed architecture. This problem is particular acute when the system includes a high number of logical and/or physical entities (referred to as subjects), each one controlling different resources; the problem is further exacerbated if the subjects have a high level of complexity or are dispersed across a large number of installations.

The management environments known in that art are typically based on an enforcement model (also known as manager/workers model). In this model, the process is entirely controlled by an authority residing at a central site of the system. The authority defines a desired configuration of every subject. For this purpose, the authority accesses a central repository storing the (alleged) current configuration of each subject, and determines the management actions required to bring the subject to the desired configuration starting from its current configuration. The management actions are then enforced remotely by the authority on the subject (which is totally passive).

A different approach is proposed in WO-A-2003EP10081; this document discloses an autonomic management system, wherein each subject self-adapts to the corresponding desired configuration. For this purpose, the authority publishes a set of rules into a shared repository; each rule specifies the desired configuration for a category of subjects (defined according to their physical/logical characteristics). Each subject retrieves and applies the corresponding rules directly. In this way, the subjects are no longer passive entities but they actively participate in the configuration process. As a consequence, it is possible to avoid inconsistencies and support subjects that are not available or off-line. In the above-described solution the control of the environment is fully automated and delegated to the subjects (with a system administrator that is required to intervene only when a malfunctioning occurs or when some subjects are unable to comply with the corresponding rules).

Nevertheless, in different practical situations it would be desirable to have some sort of centralized control on the operations that are performed on the subjects.

A typical example is that of an organization moving from a resource management system based on the enforcement model to one based on the adaptive model. In the above-mentioned scenario, it is useful for the system administrator to be able to control the migration process; in this way, it is possible to implement a gradual transition between the two different resource management models.

It should be noted that those requirements are completely incompatible with the adaptive nature of the resource management system described in the cited document. Therefore, any attempt to provide some sort of centralized control risks disrupting the proposed model.

This problem is particular acute in large systems with several correlated tiers, wherein a solution to be deployed in the system is very complex; therefore, any changes in the definition of the solution should be avoided since their effects can be unpredictable.

SUMMARY OF THE INVENTION

It is an object of the present invention to provide an autonomic management method that supports a centralized control of the operations performed on the subjects.

It is another object of the present invention to allow authorizing the operations centrally.

It is yet another object of the present invention to implement the authorization control without impairing the self-adaptive model.

Particularly, it is an object of the present invention to facilitate a gradual transition from a resource management system based on the enforcement model to one based on the adaptive model.

Moreover, it is an object of the present invention to achieve those results in a way that is simple and easy to un-plug.

The accomplishment of these and other related objects is achieved by the solution set out in the independent claims.

Briefly, an aspect of the present invention provides an autonomic management method for use in a data processing system including at least one central authority entity and a plurality of subject entities; the method is used for self-configuring the subject entities, each subject entity belonging to at least one of a plurality of categories, wherein the method includes the steps of: the at least one authority entity publishing a plurality of rules each one defining a target state for a category, at least one of the rules being conditioned to an authorization, the at least one authority entity granting the authorization to apply at least one selected conditioned rule on at least one selected subject entity, and each subject entity applying each non-conditioned rule and each authorized conditioned rule for the at least one category of the subject entity to configure the subject entity according to the corresponding target state.

The present invention also provides a computer program for performing the method and a product embodying the program.

Moreover, a corresponding data processing system is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
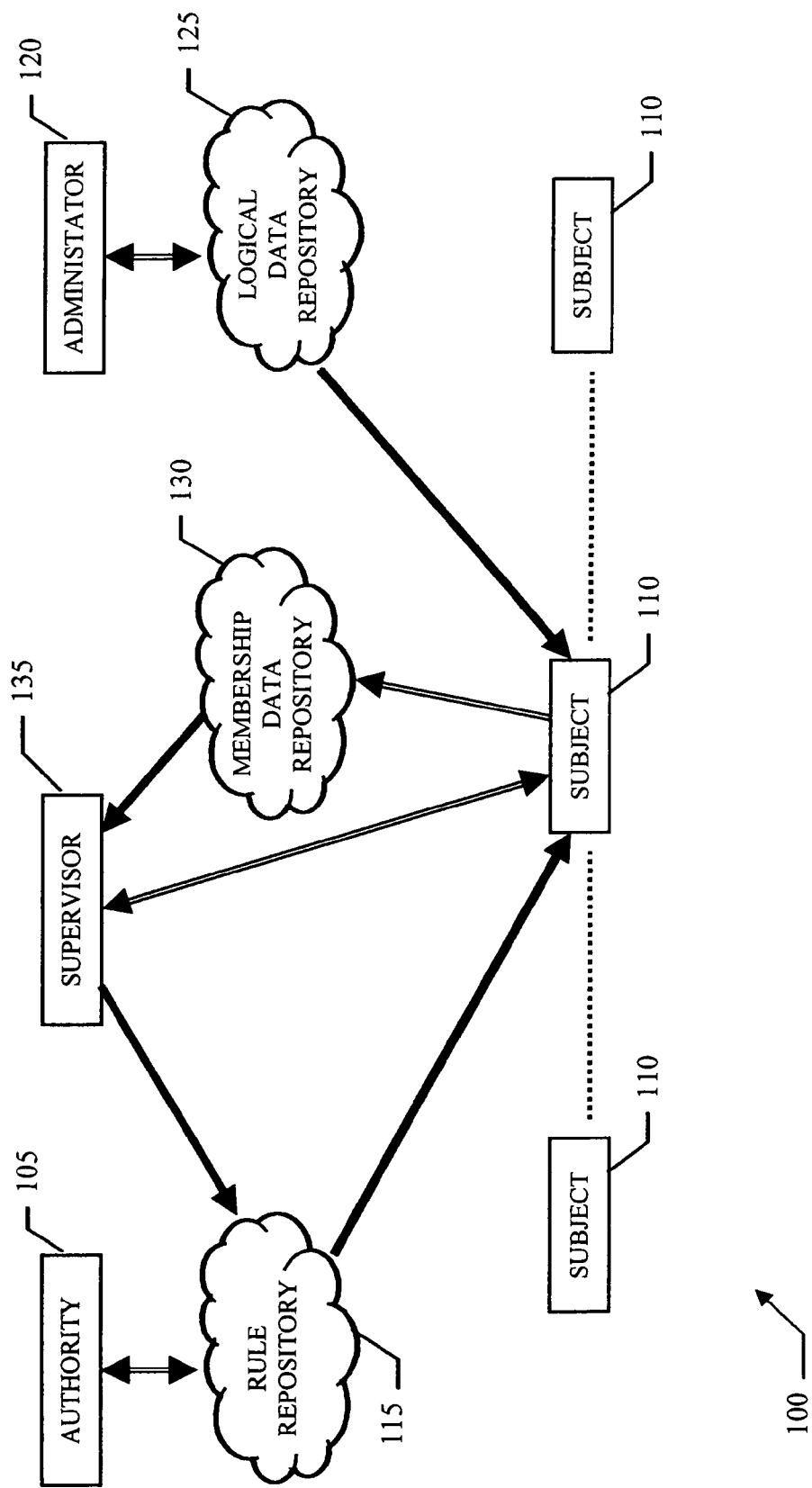
FIG. 1a is a schematic block diagram of a data processing system in which the method of the invention is applicable.

With reference in particular to FIG. 1a, a data processing system 100 with a distributed architecture (typically INTERNET-based) is shown. The system 100 implements an environment for managing several kinds of resources, such as products in a software distribution application or in a monitoring application, hardware devices, and the like.

A computer 105 operates as an authority, which is responsible to define a desired configuration of the system 100. Multiple computers 110 operate as heterogeneous subjects, which directly control one or more instances of different resources under management. Each subject 110 is defined by one or more characteristics of logical and/or physical entities (such as a desktop, a Personal Digital Assistant (PDA), a SIM card of a mobile telephone, every user of a workstation, and the like).

The authority 105 and the subjects 110 communicate in an associative way (at the information level). Particularly, the authority 105 publishes a set of rules (or laws) into a shared repository 115. Each rule specifies a desired configuration for a category of subjects, defined according to their logical and/or physical characteristics; particularly, the desired configuration is characterized by a target state of specific resources (which instances are controlled by the subjects belonging to the category specified in the rule). Some rules are conditioned to an authorization for their application on the subjects; the conditioned rules are identified by the addition of an enabling code, which can take one of a set of predefined values. The subjects 110 access the rule repository 115, in order to retrieve the corresponding rules (as described in the following).

A preferred grammar that can be used for defining the rules is described in the above-mentioned document WO-A-2003EP10081. Briefly, each rule includes a WHO clause (which defines the category associated with the rule) and a WHAT clause (which describes the resource to be configured by the rule and its target state). The rule further includes an optional AUTH clause, which specifies the enabling code associated with the rule. The AUTH clause is not necessary when the application of the rule is not conditioned to any authorization.

A computer 120 operates as an administrator, which is responsible to define logical properties of the subjects 110 dynamically. The administrator publishes the information into a (shared) logical data repository 125, which is accessed by the subjects 110.

The subjects 110 communicate through an additional shared repository 130 (defining a virtual word implemented in the system 100); for each subject 110, the repository 130 stores membership data specifying the category of the subject and its compliance with the corresponding rules.

An additional computer 135 operates as a supervisor, which authorizes the application of the conditioned rules on the subjects 110. The authorization is granted either individually or to groups of subjects 110; each group can be defined statically (for example, by a list) or dynamically (according to conditions based on specific characteristics of the subjects 110). The supervisor 135 accesses the membership data repository 130, in order to identify the subjects 110 belonging to any dynamic group. Moreover, the supervisor 135 can also remove selected enabling codes from the conditioned rules published in the corresponding repository 115, when those rules are authorized indiscriminately for every subject 110.

The above-described repositories implement a peer-to-peer communication model, which totally decouples the different entities of the system 100 (authority 105, subjects 110, administrator 120 and supervisor 135). Particularly, a destination decoupling results from the fact that the entities do not need to refer to each other explicitly (thereby providing a fully anonymous communication scheme); in other words, a mutual knowledge of the location of the different entities is not necessary. Moreover, time decoupling results from the fact that the entities do not need to be available at the same time.

Figure 1B:
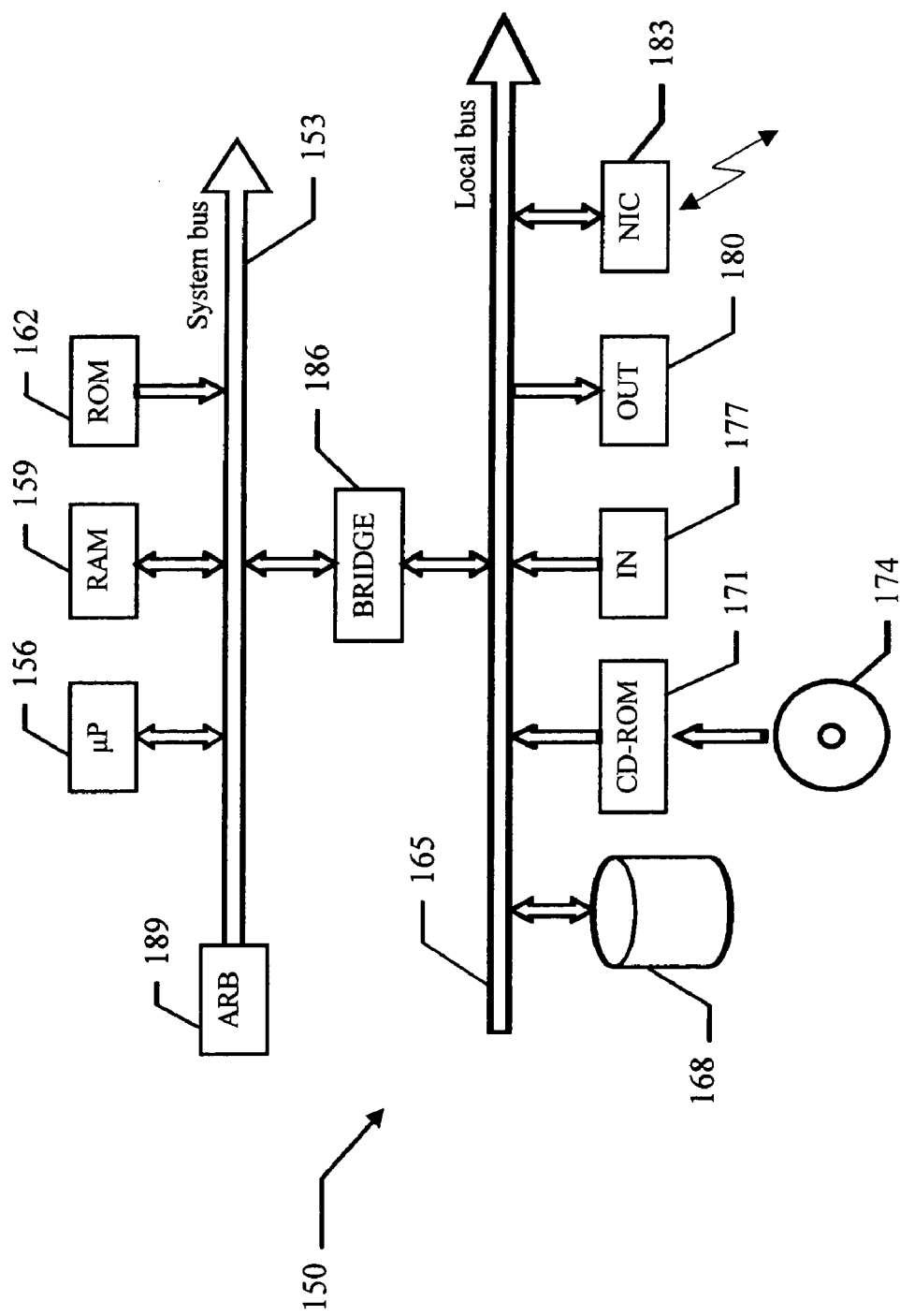
FIG. 1b shows the functional blocks of a generic computer of the system.

As shown in FIG. 1b, a generic computer of the system (authority, subject, administrator or supervisor) is denoted with 150. The computer 150 is formed by several units that are connected in parallel to a system bus 153. In detail, one or more microprocessors (μP) 156 control operation of the computer 150; a RAM 159 (typically consisting of interleaved modules) is directly used as a shared working memory by the microprocessors 153, and a ROM 162 stores basic code for a bootstrap of the computer 150. Peripheral units are clustered around a local bus 165 (by means of respective interfaces). Particularly, a mass memory consists of one or more hard-disks 168 and drives 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the INTERNET. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

However, the concepts of the present invention are also applicable when the data processing system has another architecture (for example, based on a LAN), or when different resources and entities are envisaged. Similar considerations apply if the computers have another structure or include equivalent units. Alternatively, two or more authorities, administrators and/or supervisors are provided, or the authority, the administrator and/or the supervisor simply consists of different roles played by a single entity; moreover, two distinct repositories can be used for publishing the information about the categories of the subjects and the information about the compliance of the subjects with the corresponding rules, respectively, or two or more of the repositories can be consolidated into a single structure.

Figure 2:
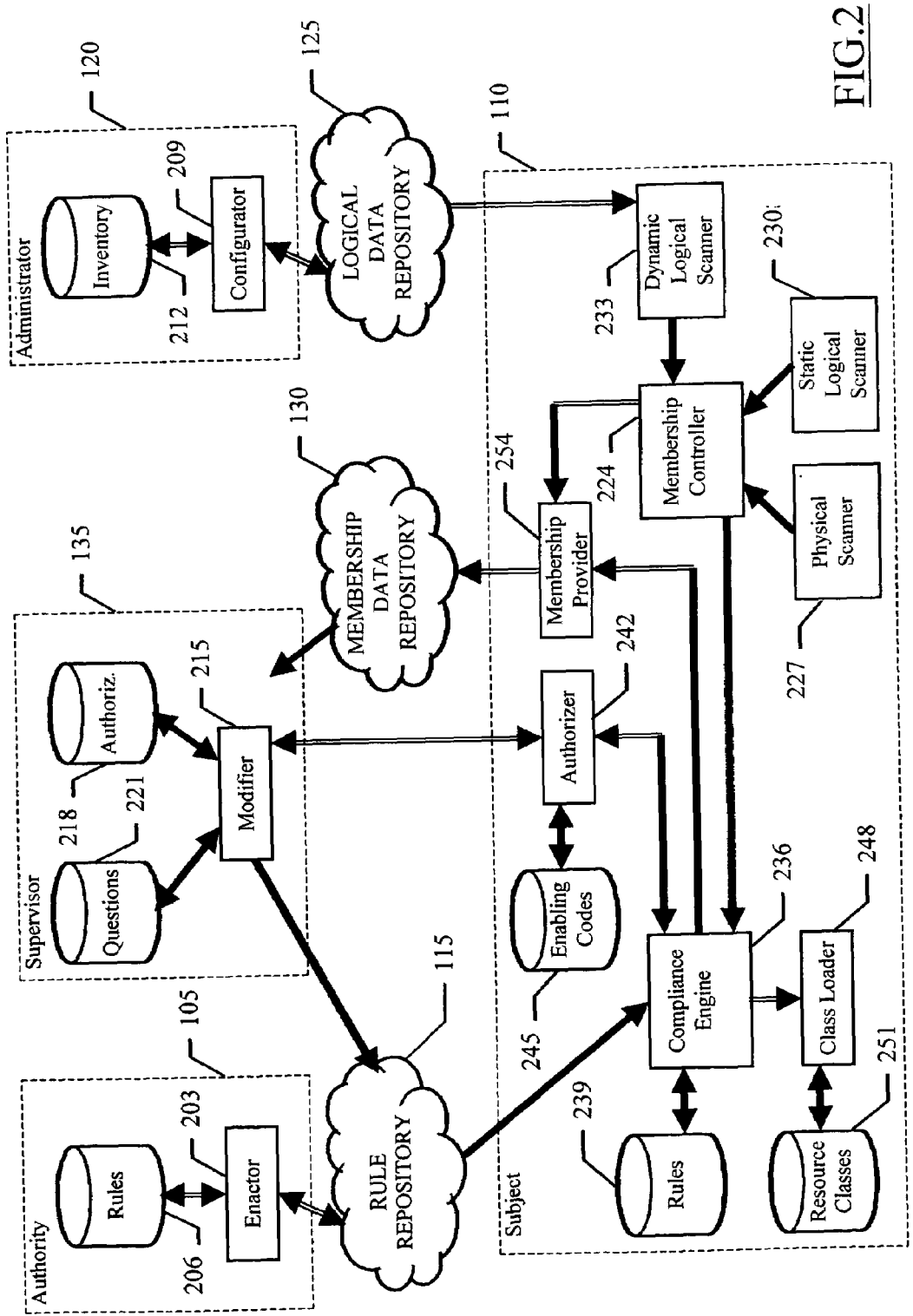
FIG. 2 depicts the main software components that can be used for practicing the method.
Figure 3A:
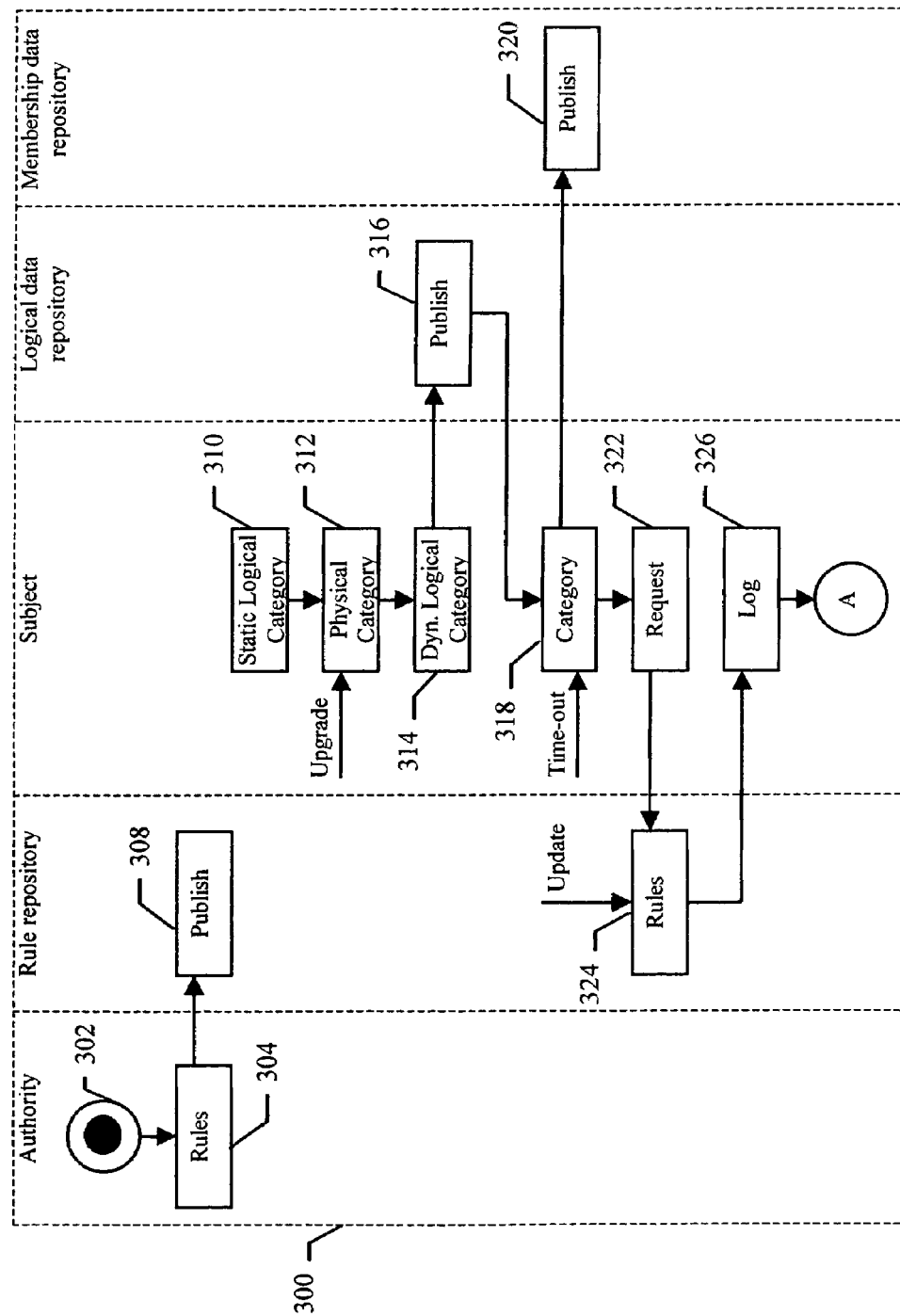
FIGS. 3a-3e show a diagram describing the flow of activities relating to an illustrative implementation of the method.
Figure 3B:
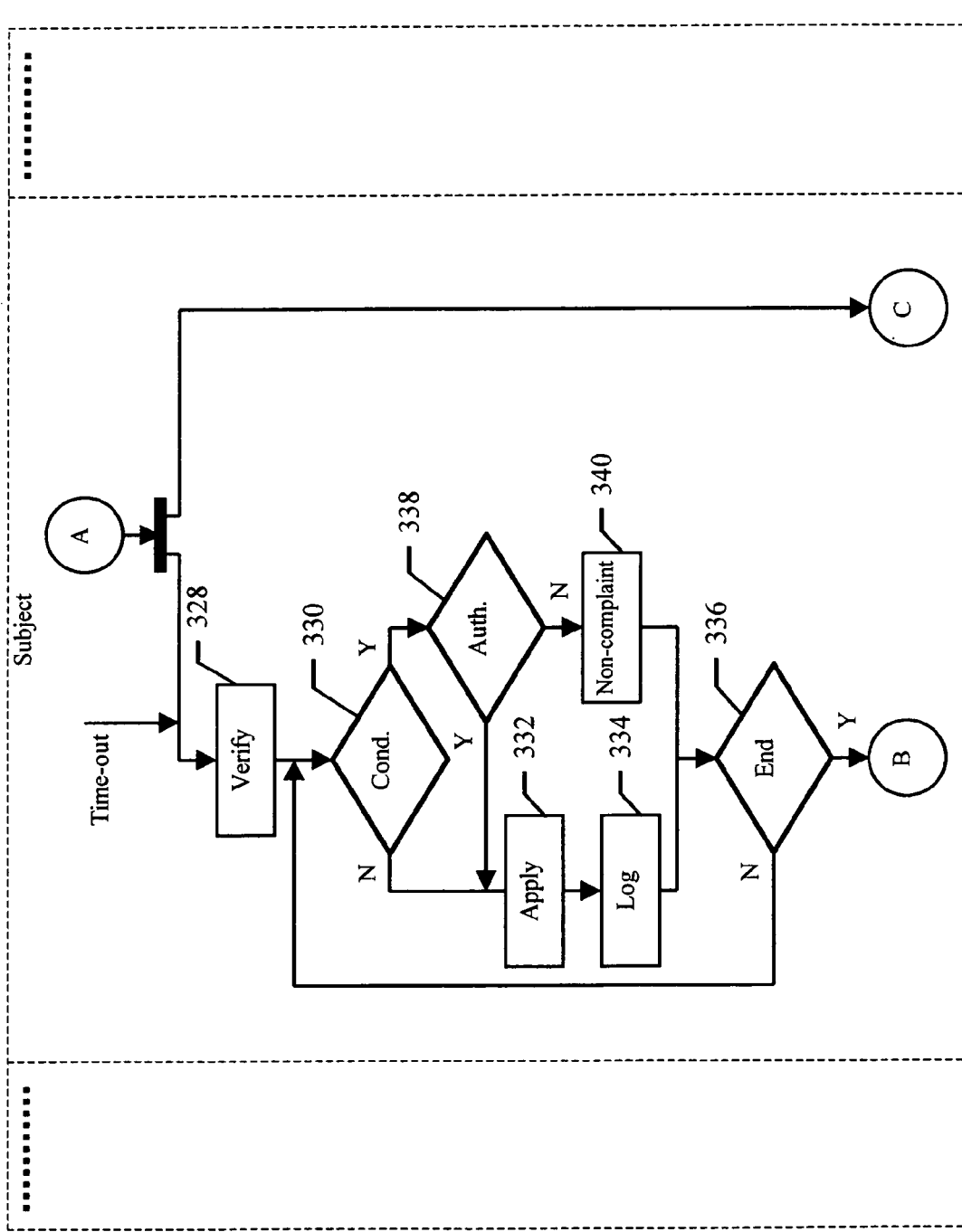
Figure 3C:
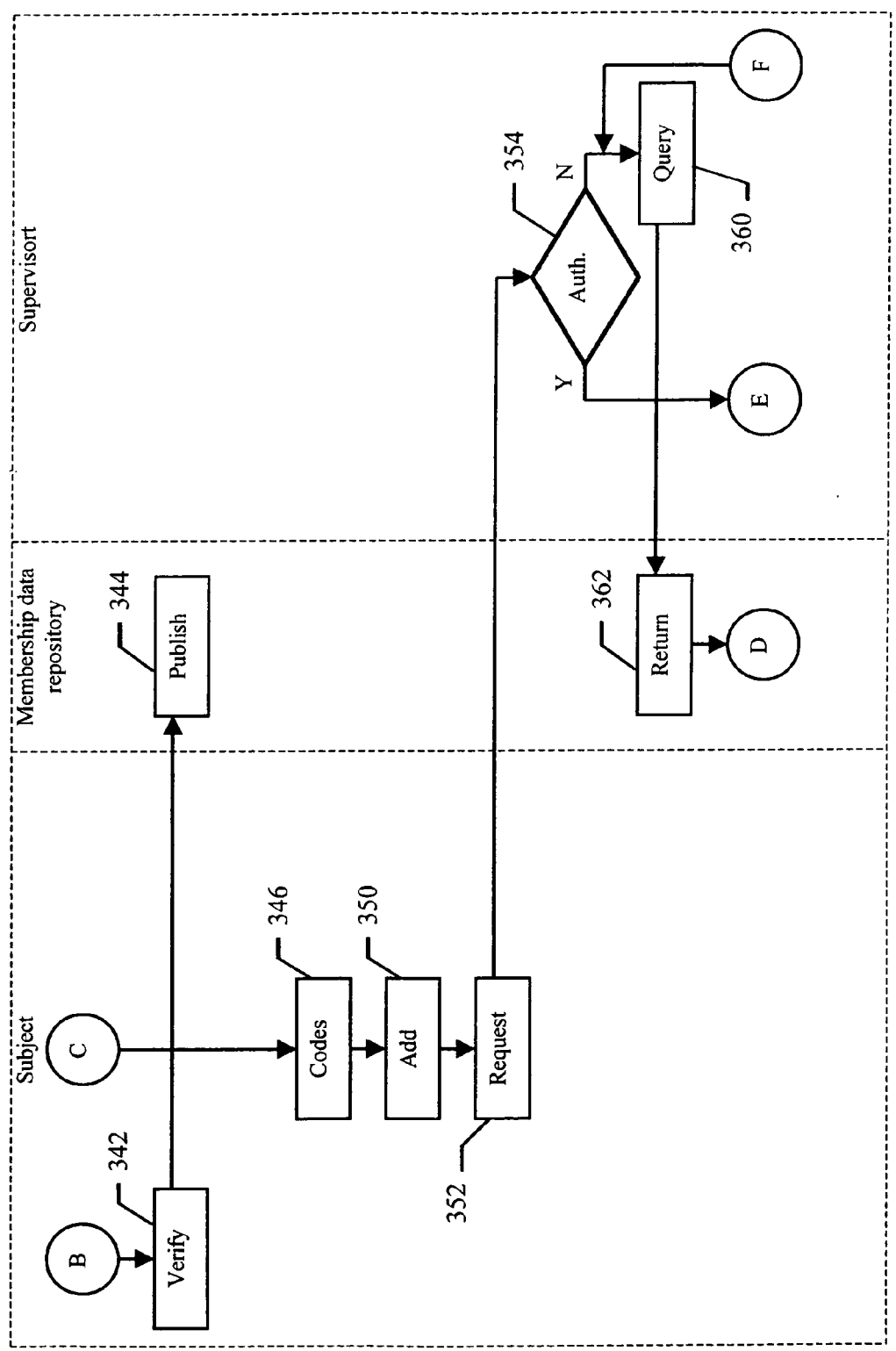
Figure 3D:
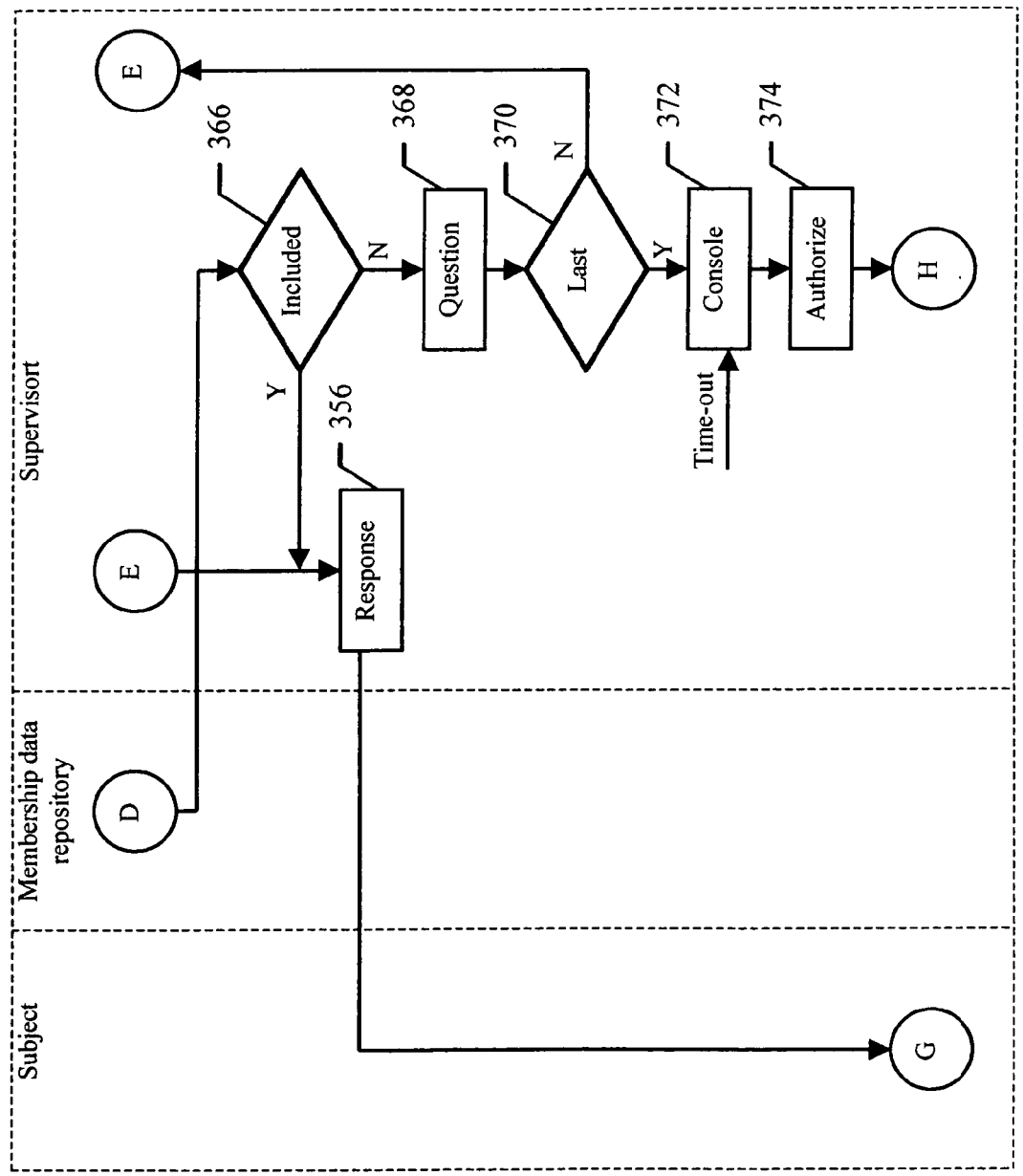
Figure 3E:
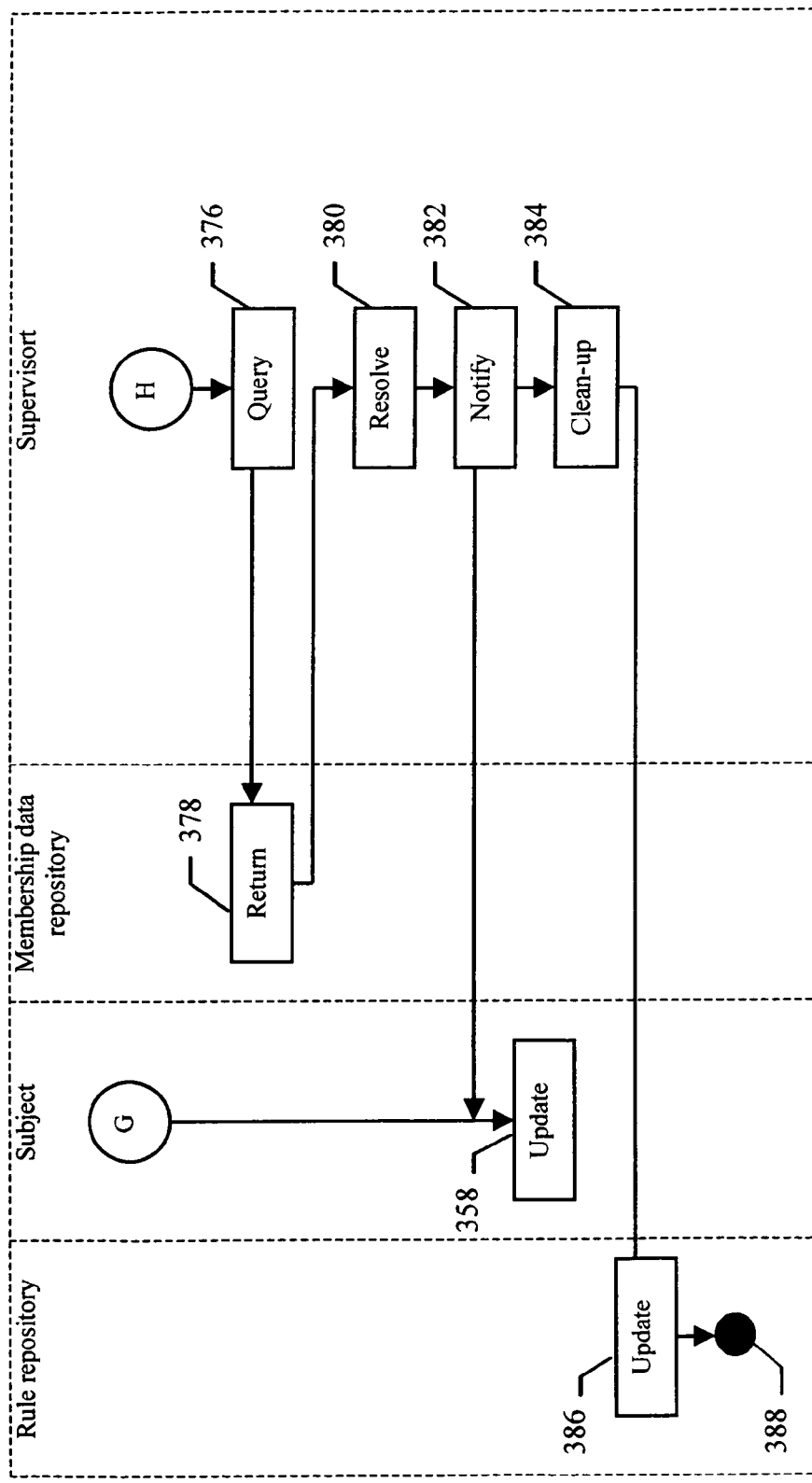

Considering now FIG. 2, the main software components that can be used to practice the method of the invention are depicted. The information (programs and data) is typically stored on the different hard-disks and loaded (at least partially) into the corresponding working memories when the programs are running, together with an operating system and other application programs (not shown in the figure). The programs are initially installed onto the hard-disks from CD-ROMs.

Particularly, the authority 105 includes an enactor 203 for defining new rules (either conditioned or non-conditioned). The new rules are stored into a corresponding log 206. The enactor 203 checks the semantic correctness of each new rule; if the new rule is not in contrast to the other rules, the enactor 203 publishes the new rule into the corresponding repository 115.

Passing to the administrator 120, a configurator 209 is used to set the dynamic logical properties of the subjects 110 (which information is published into the corresponding repository 125). For example, those logical properties specify a current function of each subject 110 in the system (such as server or agent in a monitoring application, depot in a software distribution application, and the like). For this purpose, the configurator 209 accesses an inventory 212 storing information about the organization of a company wherein the system is used.

With reference now to the supervisor 135, a modifier 215 manages the authorization process. For this purpose, the modifier 215 controls a catalogue 218, which stores information about the subjects that have been authorized to apply the conditioned rules including different enabling codes (either individually or through dynamic/static groups). The modifier 215 also controls a list 221 of questions relating to the pending authorizations that have been requested by the subjects 110. Preferably, the modifier 215 implements two distinct consoles. A first console is used to authorize the application of the conditioned rules on single subjects 110 (for example, by a local system administrator); a second console is used to authorize the application of the conditioned rules on the subjects 110 belonging to specific static/dynamic groups (for example, by a central system administrator). The modifier 215 also interfaces with the rule repository 115, in order to update the published rules when they are authorized indiscriminately.

Preferably, each repository (rule repository 115, logical data repository 125, and membership data repository 130) is implemented as a Web application. Each subject 110 can register with any desired repository submitting a corresponding identifier (typically consisting of a Globally Unique Identifier, or GUID) and any other relevant information (such as its category).

Considering now a generic subject 110, a membership controller 224 is used to assign the subject 110 to the respective category (according to its logical and/or physical characteristics). For this purpose, the membership controller 224 cooperates with different plug-in scanners.

Particularly, a first scanner 227 assigns the subject 110 to a category defined according to its physical properties. For example, the physical category is specified by hardware characteristics (such as a hard-disk size, a CPU model, or a working memory capacity) and/or software characteristics (such as installed applications, files or folders). For this purpose, the physical scanner 227 leverages a hardware inventory explorer, a software inventory explorer and an application explorer (not shown in the figure).

A different scanner 230 statically assigns the subject 110 to a category defined according to its logical properties. For example, the static logical category specifies different types of users (such as secretaries, managers, developers, system engineers) or different characteristics of physical entities (such as desktops, laptops, PDAs, mobile telephones); the static logical scanner 230 derives the category of the subject 110 from an identification code that is input during a login procedure or is hardwired.

Another scanner 233 assigns the subject 110 to a category defined according to its dynamic logical properties. For this purpose, the dynamic logical scanner 233 interfaces with the corresponding repository 125.

A compliance engine 236 receives the information identifying the category of the subject 110 from the membership controller 224. The compliance engine 236 retrieves the rules relating to the category of the subject 110 from the corresponding repository 115. The retrieved rules are stored into a log 239.

The compliance engine 236 requests the authorization to apply each conditioned rule on the subject 110 to a dedicated module 242. The authorizer 242 controls an enabling code catalogue 245; for each relevant enabling code, the catalogue 245 indicates whether the subject 110 is authorized or not to apply the conditioned rules including that enabling code. The authorizer 242 interfaces with the modifier 215, in order to update the content of the enabling code catalogue 245 as the authorizations are granted by the system administrator(s); preferably, this process is asynchronous with respect to the one relating to the grant of the authorizations requested by the compliance engine 236.

The compliance engine 236 controls the application of the rules (stored in the log 239) on the subject 110. For this purpose, the compliance engine 236 interfaces with a class loader 248, which is used to load the classes 251 controlling the resources under management on the subject 110 (from one or more repositories, not shown in the figure). Each resource class 251 manages a state catalogue, which specifies the current state of the corresponding resource. The resource class 251 further accesses a transition table; for each pair current state/target state, the transition table indicates one or more management actions required to bring the resource from the current state to the target state.

The compliance engine 236 updates the log 239 according to the result of the application of the rules; particularly, for each rule the log 239 stores information indicating whether the subject 110 is compliant or not with the rule. A membership provider 254 receives information specifying the category of the subject 110 (physical category, static logical category and/or dynamic logical category) from the membership controller 224; moreover, the membership provider 254 receives information indicating the compliance of the subject 110 with the corresponding rules from the compliance engine 236. The membership provider 254 publishes the information into the corresponding repository 130.

Similar considerations apply if a whole application (consisting of the programs on the different computers) and the corresponding data are structured in a different manner, if other modules or functions are provided, or if the programs are distributed on any other computer readable medium (such as a DVD). However, the concepts of the present invention are also applicable when the new rules are not validated by the authority, or when the shared repositories are implemented with different technologies. Alternatively, the categories are based on other characteristics of the subjects, the physical and/or logical characteristics of the subjects are detected in a different manner, or the categories are defined in another way (for example, with a different number and/or type of components, down to a single one). Moreover, the modifier can implement a single console, or the authorization process can be controlled by the compliance engine directly.

In the system described above, each subject self-adapts to the rules published by the authority; at the same time, however, the application of the conditioned rules is controlled centrally by the supervisor. As shown in FIGS. 3a-3e, a corresponding process 300 begins at the black start circle 302 (in the swim-lane of the authority). Descending into block 304, the authority defines a set of new rules implementing a desired solution to be deployed in the system. If the new rules are semantically correct, they are logged and then published at block 308 into the corresponding repository.

The flow of activities continues to block 310 in the swim-lane of a generic subject; in this phase, the static logical category of the subject is derived from the identification code that is input during the login procedure or is hardwired. Hardware and software scans are then executed at block 312 (assuming that the rules for installing the corresponding components have already been applied), in order to detect the physical category of the subject; the same activities are also performed in response to the notification of a software and/or hardware upgrade carried out on the subject.

The process continues to block 314, wherein the subject queries the logical data repository in order to identify its dynamic logical category. Moving to block 316 in the swim-lane of the logical data repository, the desired information is retrieved and returned to the subject. The same point is also reached whenever updated information is published into the logical data repository for the subject (under the control of the administrator); in this way, the subject is promptly notified of any change in its dynamic logical category (assuming that the subject has previously registered with the logical data repository).

Returning to the swim-lane of the subject at block 318, information identifying the category of the subject (static logical category, physical category and dynamic logical category) is supplied to the membership data repository. The same activity is also performed whenever a predetermined time-out expires (for example, every hour). If the category of the subject has changed, the information about the new category is published into the membership data repository at block 320.

The flow of activities continues to block 322, wherein the subject requests the rules for its category to the corresponding repository. Moving to the swim-lane of the rule repository, the desired rules are retrieved and returned to the subject at block 324, so as to implement a pull mode of operation. The same point is also reached whenever new rules are published for the category of the subject (under the control of the authority); in this way, the subject is promptly notified of any relevant new rule (assuming that the subject has previously registered with the rule repository), so as to implement a reactive mode of operation. Returning to the swim-lane of the subject, the received rules and logged at block 326.

The method then forks into two branches that are executed independently. A first branch involves the application of the retrieved rules on the subject; this procedure implements a trail-and-fail algorithm (as described in the above-mentioned document WO-A-2003EP10081), which allows resolving any dependencies among the management actions automatically. The same activity is also performed whenever a predetermined time-out expires (for example, every day). In this way, the new rules are applied on the subject as soon as they are received; in addition, all the rules are periodically re-applied, so as to implement a healing mode of operation.

Particularly, the rules to which the subject is not complaint are identified at block 328. A loop is then executed for applying those pending rules; the loop starts at decision block 330 by verifying whether a current rule (starting from the first one) is conditioned. If not, the rule is applied on the subject at block 332. For this purpose, first of all the current state of the corresponding resource is detected. A list of the actions needed to bring the resource to the target state (specified in the pending rule) from its current state is extracted from the corresponding transition table. Those actions are then executed on the subject (this approach also allows the subject to self-repair its configuration, by restoring the correct target state of any resource that was corrupted). Descending to block 334, the entry of the state catalogue for the resource is updated accordingly; moreover, if the application of the rule has been successful (bringing the resource to the desired target state) the corresponding log is updated to indicate that the subject is now complaint with the rule. The flow of activity then descends into block 336 (described in the following).

Referring back to block 330, if the rule is conditioned a test is made at block 338 to determine whether the application of the rule is authorized on the subject (as indicated in the enabling code catalogue). If so, the conditioned rule is applied at block 332 (repeating the operations described above). Conversely, the corresponding log is updated at block 340, to indicate that the subject is not compliant with the rule for a lack of authorization (the same point is also reached if no authorizer is installed on the subject); the method then descends into block 336.

Considering now block 336, the subject verifies whether the application of the rules has been completed; this condition is satisfied when either all the non-conditioned rules have been successfully applied or when the number of the pending non-conditioned rules does not decrease with the iterations of the loop (in this case, a deadlock is detected since some pending rules are prevented from successfully bringing the corresponding resources to their target states). If the processing of the rules has not been completed, the method returns to block 330 in order to repeat the operations described above. On the contrary, the method exits the loop at block 342. The subject verifies whether the resources specified in the rules to which the subject should be compliant are still in the desired target state; if not, an infinite loop is detected, since the application of some rules impairs the target state reached by the resources corresponding to other rules. In any case, information about the compliance of the subject with the relevant rules is transmitted to the membership data repository; the information is published into the membership data repository at block 344.

Referring back to block 326, at the same time a list of the enabling codes included in the new conditioned rules that have just been retrieved is passed to the authorizer at block 346. The authorizer at block 348 adds any new enabling codes (for which no information is available about their authorizations) in the corresponding catalogue; each new entry specifies that the application of the rules including the corresponding enabling code is not authorized. The subject then requests the needed authorizations to the supervisor at block 352, by passing its identifier and the enabling codes still to be authorized (as indicated in the corresponding catalogue). Moving to block 354 in the swim-lane of the supervisor, a test is made to determine whether the subject has been indiscriminately authorized for the application of any rule. If so, the information is returned to the subject at block 356. In response thereto, the authorizer updates the enabling code catalogue accordingly at block 358.

Conversely, the supervisor executes a loop to verify the authorization for each enabling code received from the subject (starting from the first one). Particularly, if the enabling code has been authorized for a dynamic group, information about the characteristics of the subject being relevant for the definition of the dynamic group is requested to the membership data repository at block 360. The desired information is retrieved and returned to the supervisor at block 362. The method then branches at block 366 according to whether the subject has been authorized for the enabling code or not. In detail, if the enabling code has been authorized for specific subjects or a static group, the method verifies whether the subject is included in the corresponding list; on the other hand, if the enabling code has been authorized for a dynamic group, the method verifies whether the characteristics of the subject meet the conditions defining that group. If the result of the verification is positive, the information is returned to the subject at block 356.

Conversely, if the enabling code has not been authorized for the specific subject (or for any subject) the modifier at block 368 builds the related question, which is added to the corresponding list. A test is then made at block 370 to determine whether the last enabling code received from the subject has been verified. If not, the method returns to block 360 to repeat the operations described above for a next enabling code. Once all the requests submitted by the subject have been processed, the method exits the above-described loop.

Considering now block 372, the question list is submitted to the system administrator(s). Different scheduling policies can be implemented for performing this operation (for example, periodically, when the number of pending questions reaches a threshold, whenever a new question is added, or upon request by the system administrator); moreover, the questions can be submitted with different criteria (for example, by department the subjects belong to). Continuing to block 374, the system administrator grants or denies the authorizations relating to each question; the information about each granted authorization in also logged into the corresponding catalogue.

The supervisor then identifies all the subjects that must be notified of the granting of any authorization. Particularly, if the enabling codes have been authorized for single subjects or static groups this information is already available. Conversely, when the authorizations relate to dynamic groups, the supervisor requests information about the subjects belonging to the corresponding categories to the membership data repository at block 376. In response thereto, the desired information is retrieved and returned to the supervisor at block 378. Referring now to block 380, the definitions of the dynamic groups are resolved to actual subjects meeting the corresponding conditions.

For each newly authorized enabling code, the supervisor at block 382 notifies the corresponding subjects. In response thereto, the authorizer updates the enabling code catalogue accordingly at block 358. In this way, the process of contacting the supervisor for requesting the needed authorizations is completely asynchronous with respect to the process of applying the rules on the subject; therefore, the (fully automated) operations relating to the application of the rules are unrelated from the ones relating to the granting of the authorizations (which typically involves a human-being intervention).

Returning back to the swim-lane of the supervisor, if all the subjects have been authorized indiscriminately for one or more enabling codes, the supervisor at block 384 sends a corresponding message to the rule repository. In response thereto, those enabling codes are removed from each published rule at block 386 (with the updated rules that are deployed to the relevant subjects automatically). The flow of activity then ends at the concentric white/black stop circles 388.

Similar considerations apply if an equivalent process is executed or if additional functions are provided. However, the concepts of the present invention are also applicable when the subjects operate in another way (for example, only in the pull mode or only in the reactive mode), or when the application of the rules on the subjects involves different operations. For example, the administrator can enforce correction actions on non-compliant subjects, or the system can include one or more subjects operating as helpers for controlling the application of the rules on subjects that are not completely autonomous (for example, on mobile telephones). Alternatively, the questions are generated and submitted in another way, or the enabling codes are authorised with a different procedure.

More generally, an aspect of the present invention proposes an autonomic management method for use in a data processing system; the system includes one or more central authority entities and a plurality of subject entities. The method is used for self-configuring the subject entities; each subject entity belongs to one or more of a plurality of categories. The method starts with the authority entity that publishes a plurality of rules each one defining a target state for a category; one or more of the rules are conditioned to an authorization. Moreover, the authority entity grants the authorization to apply selected conditioned rules on one or more selected subject entities. Each subject entity then applies each non-conditioned rule and each authorized conditioned rule for the category of the subject entity, in order to configure the subject entity according to the corresponding target state.

The solution of the invention provides an autonomic management method that supports a centralized control of the operations performed on the subjects.

In this way, the operations can be authorized centrally. Nevertheless, the authorization control is implemented without impairing the self-adaptive model.

Particularly, the present invention provides a solution that facilitates a gradual transition from a resource management system based on the enforcement model to one based on the adaptive model (even if other applications are contemplated and within the scope of the invention).

Moreover, those results are achieved in a way that is simple and easy to un-plug.

The preferred embodiment of the invention described above offers further advantages.

Particularly, each subject retrieves all the rules corresponding to its category; the subject then applies the non-conditioned rules and the conditioned rules that are authorized (while it remains non-complaint with respect to the conditioned rules that are not authorized).

In this way, the authorization process is managed by each subject directly.

As a further enhancement, the application of each rule is authorized according to information being stored on the subject itself (with the information that is updated under the control of the supervisor).

In the proposed embodiment, the management of the authorizations and the application of the rules are completely unrelated.

In any case, the solution according to the present invention is also suitable to be put into practice with each subject that only retrieves the non-conditioned rules and the authorized conditioned rules from the corresponding repository, or processing each request of authorization when it is submitted (by contacting the supervisor immediately and waiting for a corresponding response).

In a preferred embodiment, each conditioned rule includes a specific enabling code.

This feature allows clustering the rules by authorisation requirements (for example, according to different subsystems of the whole solution to be deployed).

As a further enhancement, one or more of the enabling codes are authorised for a group of subjects (defined according to a predefined criterion).

The proposed solution strongly simplifies the management of the authorisations.

Advantageously, one or more of the groups are defined dynamically according to the characteristics of the subjects.

This choice provides a high degree of flexibility, and allows defining the subjects belonging to each group at run-time.

However, the solution according to the present invention leads itself to be implemented even defining the conditioned rules in a different way (for example, adding a specific new characteristic in the WHO clause). Moreover, the authorization can be managed with other enabling codes (for example, supporting nested authorization schemes or a different number of values, down to a single one). Alternatively, the groups are defined in a different manner (for example, by department), the system only supports static or dynamic groups, or the authorizations can be granted only to specific subjects.

A way to further improve the solution is that of supporting the possibility of authorizing one or more enabling codes for every subject (with those codes that are then removed from the corresponding published rules).

The devised feature allows removing the authorization control as the resource management system approaches a fully adaptive model.

In addition or in alternative, the authorization can also be granted for all the rules to be applied on one or more selected subjects.

This feature provides an additional level of customization of the process.

In any case, the solution of the invention is also suitable to be implemented without any explicit support for authorizing selected rules for every subject (in this case, the same result can be achieved replacing the published conditioned rules with corresponding non-conditioned rules). Alternatively, the proposed solution controls the authorizations with other criteria, for example, only by subjects (either individually and/or in groups).

Advantageously, the solution according to the present invention is implemented with a computer program, which is provided as a corresponding product embodied in a suitable medium.

Alternatively, the program is pre-loaded onto the hard-disks, is sent to the computers through a network (typically the INTERNET), is broadcast, or more generally is provided in any other form directly loadable into a working memories of the computers. However, the method according to the present invention leads itself to be carried out with a hardware structure (for example, integrated in chips of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. In a data processing system including at least one central authority entity and a plurality of subject entities, an autonomic management method for self-configuring the subject entities, each subject entity belonging to at least one of a plurality of categories, wherein the method comprises the steps of:
   the at least one authority entity publishing a plurality of rules each one defining a target state for a category of subject entities, at least one of the rules being conditioned to an authorization,
   the at least one authority entity granting the authorization to apply at least one selected conditioned rule on at least one selected subject entity,
   each subject entity applying each non-conditioned rule and each authorized conditioned rule for the at least one category of the subject entity to configure the subject entity according to the corresponding target state, and
   each subject entity storing a result of applying each non-conditioned rule and each authorized conditioned rule for the at least one category of the subject entity to configure the subject entity according to the corresponding target state in memory.

2. The method according to claim 1, wherein the step of applying each non-conditioned rule and each authorized conditioned rule comprises:
   retrieving each rule for the at least one category of the subject entity, and
   verifying the authorization to apply each retrieved conditioned rule on the subject.

3. The method according to claim 2, further comprising the steps of:
   storing authorization information indicative of the authorization to apply each retrieved rule on each subject entity, the verification of the authorization to apply each retrieved conditioned rule on the subject entity being based on the authorization information, and
   updating the authorization information under the control of the at least one authority entity.

4. The method according to claim 1, wherein each conditioned rule includes one of a plurality of enabling codes, the step of granting the authorization to apply the at least one selected conditioned rule on the at least one selected subject entity comprising:
   granting the authorization to apply each conditioned rule including at least one selected enabling code on the at least one selected subject entity.

5. The method according to claim 4, wherein the at least one selected subject entity consists of a group of subject entities being dynamically defined according to characteristics of the subject entities.

6. The method according to claim 5, wherein the group is a dynamic group defined by characteristics of the subject entities, the method further comprising the steps of:
   each subject entity publishing an indication of the corresponding characteristics, and
   the at least one authority entity identifying the subject entities belonging to the dynamic group according to the published characteristics of the subject entities.

7. The method according to claim 4, further comprising the steps under the control of the at least one authority entity of:
   granting the authorization to apply each conditioned rule including at least one further selected enabling code on each subject entity, and
   removing the further selected enabling code from each published rule.

8. The method according to claim 1, further comprises the step of:
   the at least one authority entity granting the authorization to apply each conditioned rule on at least one further selected subject entity.

9. A computer program executable by a processor and including program code means directly loadable into a working memory of a data processing system for performing the method of claim 1 when the program is run on the system.

10. A data processing system comprising:
    at least one central authority entity and a plurality of subject entities, wherein each central authority entity and each subject entity comprises a processing unit and a memory, wherein each processing unit executes computer executable code stored in the memory, wherein each subject entity belonging to at least one of a plurality of categories, wherein the processing unit in the at least one authority entity executes the computer executable code to publish a plurality of rules each one defining a target state for a category, at least one of the rules being conditioned to an authorization, and grants the authorization to apply at least one selected conditioned rule on at least one selected subject entity, and wherein the processing unit in each subject entity executes computer executable code to apply each non-conditioned rule and each authorized conditioned rule for the at least one category of the subject entity to configure the subject entity according to the corresponding target state and store a result of a in each non-conditioned rule and each authorized conditioned rule for the at least one category of the subject entity to configure the subject entity according to the corresponding target state in memory.

11. The data processing system according to claim 10, wherein the computer executable code for applying each non-conditioned rule and each authorized conditioned rule comprises:
retrieving each rule for the at least one category of the subject entity, and
verifying the authorization to apply each retrieved conditioned rule on the subject.

12. The data processing system according to claim 11, wherein the processing unit further executes the computer executable code to:
store authorization information indicative of the authorization to apply each retrieved rule on each subject entity, the verification of the authorization to apply each retrieved conditioned rule on the subject entity being based on the authorization information, and
update the authorization information under the control of the at least one authority entity.

13. The data processing system according to claim 10, wherein each conditioned rule includes one of a plurality of enabling codes, the computer executable code for granting the authorization to apply the at least one selected conditioned rule on the at least one selected subject entity comprising:
granting the authorization to apply each conditioned rule including at least one selected enabling code on the at least one selected subject entity.

14. The data processing system according to claim 13, wherein the processing unit further executes the computer executable code under the control of the at least one authority entity to:
grant the authorization to apply each conditioned rule including at least one further selected enabling code on each subject entity, and
remove the further selected enabling code from each published rule.

15. The computer program according to claim 9, wherein the program code means for applying each non-conditioned rule and each authorized conditioned rule comprises:
retrieving each rule for the at least one category of the subject entity, and
verifying the authorization to apply each retrieved conditioned rule on the subject.

16. The computer program according to claim 15, further comprising program code means for:
storing authorization information indicative of the authorization to apply each retrieved rule on each subject entity, the verification of the authorization to apply each retrieved conditioned rule on the subject entity being based on the authorization information, and
updating the authorization information under the control of the at least one authority entity.

17. The computer program according to claim 9, wherein each conditioned rule includes one of a plurality of enabling codes, wherein the program code means for granting the authorization to apply the at least one selected conditioned rule on the at least one selected subject entity comprises:
granting the authorization to apply each conditioned rule including at least one selected enabling code on the at least one selected subject entity.

18. The computer program according to claim 17, wherein the at least one selected subject entity consists of a group of subject entities being dynamically defined according to characteristics of the subject entities.

19. The computer program according to claim 18, wherein the group is a dynamic group defined by characteristics of the subject entities, the computer program further comprising program code means for:
each subject entity publishing an indication of the corresponding characteristics, and
the at least one authority entity identifying the subject entities belonging to the dynamic group according to the published characteristics of the subject entities.

20. The computer program according to claim 16, further comprising program code means under the control of the at least one authority entity for:
granting the authorization to apply each conditioned rule including at least one further selected enabling code on each subject entity, and
removing the further selected enabling code from each published rule.

* * * * *